J. STEPHENSON.
STREET-CAR STEP.
No. 6,919. Reissued Feb. 8, 1876.
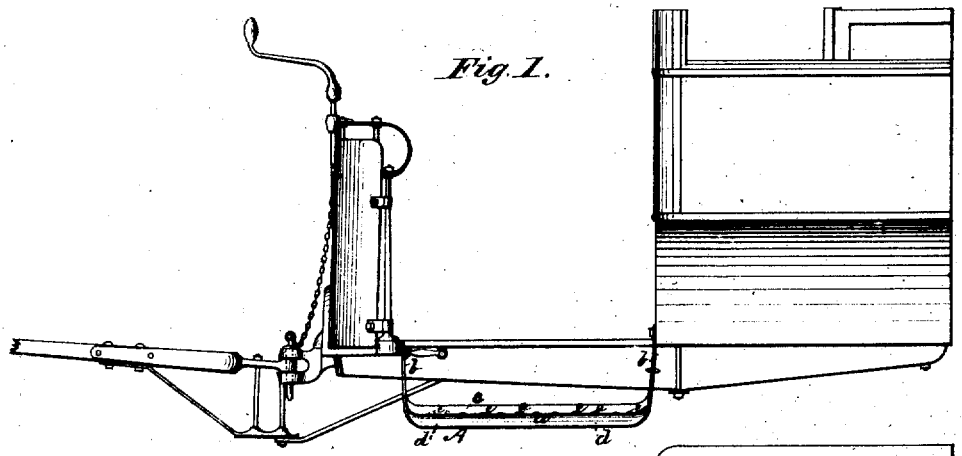
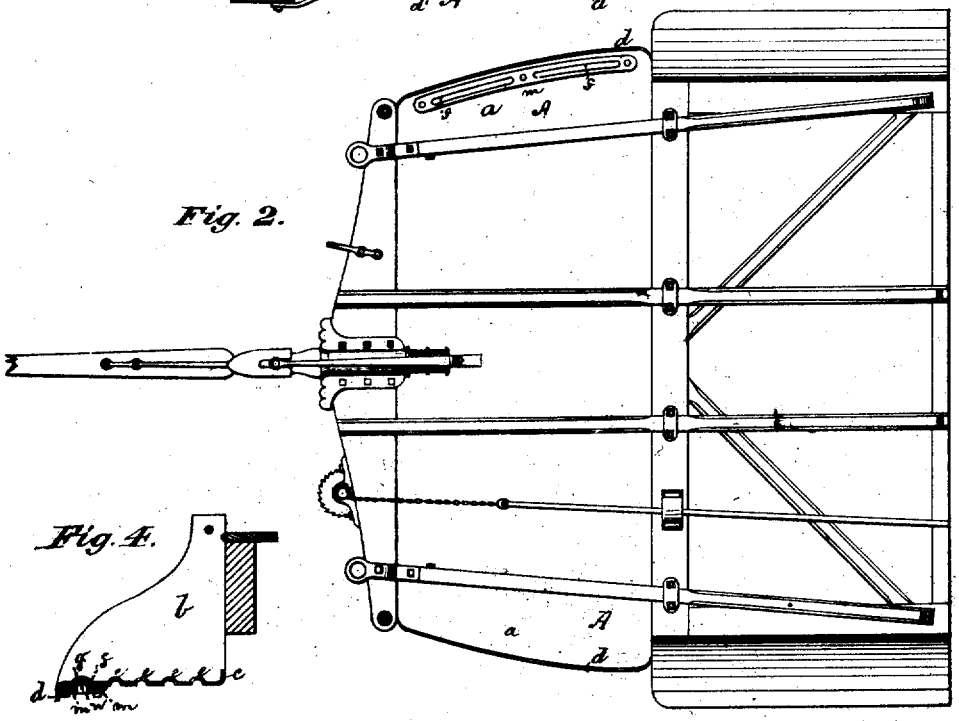
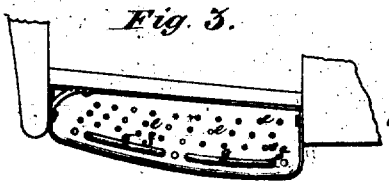
Witnesses:
D. G. Stuart
L. H. Hart
Inventor:
John Stephenson
by P. Hannay
atty.

UNITED STATES PATENT OFFICE.

JOHN STEPHENSON, OF NEW YORK, N. Y.

IMPROVEMENT IN STREET-CAR STEPS.

Specification forming part of Letters Patent No. 87,120, dated February 23, 1869; reissue No. 6,919, dated February 8, 1876; application filed August 20, 1875.

DIVISION H³.

*To all whom it may concern:*

Be it known that I, JOHN STEPHENSON, of New York, in the county of New York and State of New York, have invented certain new and useful Improvements in Street-Car Steps; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1 represents a side elevation of a portion of th front end of a street-car having my improved steps applied thereto. Fig. 2 represents a plan of the under side of the same. Fig. 3 represents a plan of the upper side of one of the steps and those portions of the car to which it is secured, the latter being represented as broken off from the car. Fig. 4 represents a cross-section of the step, outer platform-bearer, and a portion of the platform-floor, looking toward the car-body.

This division of my invention relates to a new and improved mode of constructing the steps which lead to the platforms of street-cars.

Wooden steps are very perishable and speedily wear out. The old iron steps are heavy, imparting unnecessary weight, having been made thick to give the necessary rigidity for the support of the weight of the passengers without flexure. With them a most fruitful source of accident arises from the passengers slipping off them from their front edge, and sometimes by the foot passing through beyond their inner edge, and underneath the platform.

My invention is intended to remedy these evils; and it consists, first, in constructing the step of thin plate metal, with a raised flange at its back edge, with the view of giving the necessary rigidity, and of preventing the foot from slipping therefrom; secondly, in constructing it of thin plate metal, with a turned-down flange in front, with the view of imparting the necessary rigidity to the step, and, by rounding it, of rendering it easier of access than if it presented a sharp square angle to surmount; thirdly, in constructing its upper surface with spuds or small tooth-like projections, with the view of roughening its surface, as contradistinguished from the plan of perforating the step with holes, which, although affording some relief over the plain or smooth step, is yet an objectionable form, as the holes admit the tips of canes, umbrellas, &c., and become causes of accident; fourthly, in combining with the step strips or pieces of softer, more yielding, and adhesive material than the metal of the step, in such manner as to project above the surface of the tread of the step, and so that it may be readily removed and replaced when worn out; fifthly, in constructing the steps wider at the end which adjoins the car-body than at the end next the dasher.

The narrowing of the ends of the steps at the front, and spreading the ends outwardly at the rear, impart to the steps the character of fenders, whereby they, as well as the car, are protected from damage by concussion with approaching vehicles. Moreover, this flaring construction of the steps, inasmuch as it makes their rear outer edge project beyond the line of the lower side sills of the car, protects the passengers from accident in slipping off or falling from them, as in doing so it forces or pushes the passengers outside of the line of the wheels.

To enable others skilled in the art to make and use my improvement, I will now proceed to describe it in detail.

In making my improved step A I take a piece of sheet metal, preferably iron, of suitable thickness, and cut it out in proper shape and size to form the tread and hangers *b*, by which it is suspended from, and secured to, the car. The blank thus cut out, if all the improvements are to be applied to the same step, as represented in Fig. 4, is then swaged up, so as to form a raised flange, *c*, at its inner or rear edge, and a turned-down flange, *d*, at its outer or front edge. These flanges render the steps stiff and firm. The inner flange *c* also serves as a guard or fender for the foot, to prevent it slipping through or beyond the inner edge of the step. The outer or downwardly-turned flange *d* may be slightly curved, which will give easier access to the step, and aid in protecting the step from injury when struck by the wheels of passing vehicles. The step illustrated in that figure (Fig. 4) is also provided with spuds or upwardly-projecting spurs or teeth *e* on its upper surface, which are punched or struck up from its under side. No holes are designed to be made, but simply a series of teeth or spurs, to form a roughened, or, if desired, a corrugated surface, to prevent the foot from slipping. That step is also provided with one or more slots or openings, *f*, into which a piece of soft or yielding material, *g*, such as india-rubber, is inserted in order to furnish a good foot-hold to the passenger. To this end a metal plate or plates, *m*, provided with a projection or projections, *n*, of a length and width nearly but not quite equal to the length and width of the openings *f*, are used in connection with the strips or pieces *g*, of soft and yielding material, preferably india-rubber, in such manner that when the latter are fitted over the under side of the openings *f*, and the plates *m* then applied, the projections of the latter will, when the plate is screwed up tight to the under side of the step, force the soft strips or pieces *g* up through the openings *f*, and cause them to project above the surface of the tread. A single metal plate, *m*, having corresponding projections, will suffice for all the openings *f*. By being thus constructed, the soft material can be readily removed and replaced when worn out, by simply unscrewing plate *m* from the under side of the tread *a* of the step. Either of these improvements can be applied separately, or any two or more of them together; but, as a rule, I prefer to use them all as combined in one step. In Figs. 1, 3, and 4 they are so shown. In Fig. 2 one step shows two of these features combined—to wit, the tread *a*, with the pieces *g*, of soft and yielding material, to furnish a good foot-hold, and, with the turned-down flange *d* in front, to stiffen and strengthen the step. The same figure shows the other step with another combination—to wit, with the stiffening front flange *d*, and with the spuds or projections *e* on its tread-surface. In Fig. 1 is shown the arms *b*, by which it is suspended and secured to the car, they forming part of the step. The steps A, as illustrated in Figs. 2 and 3, show that they are made somewhat narrower at their front than at their rear end, their outer edge *d* being made to run in an oblique direction at its front end toward the corresponding end of the rear edge *c*, and vice versa, thus widening the steps at the rear. This construction enables the steps to ward off damaging blows to the car from passing vehicles, and to prevent accidents to passengers when they slip off or fall from the steps, as they are thereby pushed off or dropped from them on the outside of the wheel-line.

A suitable mode of attaching the steps is illustrated in the drawings, and will be readily understood by any one skilled in the art of building street-cars, and therefore here unnecessary to be described.

Having thus described my invention, what I claim as new, and desire to secure by Letters Patent, is—

1. A car-step having a raised flange, *c*, at its rear, substantially as and for the purposes set forth.

2. A car-step having a downwardly-projecting flange, *d*, at its front, substantially as and for the purposes set forth.

3. A car-step having a raised flange, *c*, at its rear edge, and with a downwardly-projecting flange, *d*, at its front, substantially as and for the purposes set forth.

4. A sheet-metal car-step provided with upwardly-projecting spuds, struck up or otherwise formed so that the lower and upper surfaces of the step correspond, substantially as set forth.

5. A car-step provided with upwardly-projecting strips of soft material, but without raised sockets or flanges for inclosing the same, substantially as set forth.

6. A car-step having its upper surface or tread roughened by spuds or short projections *e*, combined with an independent projecting piece or pieces, *g*, of soft and yielding material, in the manner and for the purposes set forth.

7. A car-step having its upper surface provided with projecting strips or pieces *g*, of soft and yielding material, said strips or pieces *g* being secured to the steps by means of openings *f*, and a metal plate or plates, *m*, provided with projections *n*, in the manner and for the purpose substantially as described.

8. A car-step provided with a raised flange, *c*, on its rear edge, and with spuds or projections *e* on its upper surface, substantially as and for the purposes described.

9. A car-step provided with a raised flange, *c*, on its rear edge, and with a projecting piece or pieces, *g*, of soft and yielding material on its upper surface, in the manner substantially as and for the purposes set forth.

10. A car-step provided with a raised flange, *c*, on its rear edge, and with spuds or projections *e*, and a projecting piece or pieces, *g*, of soft and yielding material on its upper surface, in the manner substantially as and for the purposes set forth.

11. A car-step provided with a downwardly-projecting flange, *d*, on its forward edge, and with spuds or projections *e* on its upper surface, substantially as and for the purposes set forth.

12. A car-step provided with a downwardly-projecting flange, *d*, on its forward edge, and with a projecting piece or pieces, *g*, of soft and yielding material on its upper surface, in the manner and for the purposes set forth.

13. A car-step provided with a downwardly-projecting flange, *d*, on its front edge, and with spuds or projections *e*, and a projecting piece or pieces, *g*, of soft and yielding material on its upper surface, in the manner and for the purposes set forth.

14. A car-step provided with a raised flange, *c*, in rear, and a downwardly-projecting flange, *d*, in front, and with spuds or projections *e* on its upper surface, in the manner and for the purposes set forth.

15. A car-step provided with a raised flange, *c*, in rear, and a downwardly-projecting flange, *d*, in front, and with a piece or pieces, *g*, of soft and yielding material on its upper surface, in the manner and for the purposes set forth.

16. A car-step provided with a raised flange, *c*, in rear, and a downwardly-projecting flange, *d*, in front, and with spuds or projections *e*, and a piece or pieces, *g*, of soft and yielding material, in the manner and for the purposes set forth.

17. A car-step flaring or widening outwardly from front to rear, in the manner and for the purposes substantially as set forth.

18. A car-step in which the tread *a* and arms *b*, by which it is suspended from, and secured to, the car, are formed in one piece, substantially as set forth.

In testimony that I claim the foregoing I have hereunto set my hand this 21st day of July, 1875.

JOHN STEPHENSON.

Witnesses:
AUGUST RIPPERGER,
JOHN SMITH.